(12) United States Patent
Ma et al.

(10) Patent No.: US 12,244,700 B2
(45) Date of Patent: Mar. 4, 2025

(54) METHOD AND APPARATUS FOR ENHANCING SECURITY OF QUANTUM KEY DISTRIBUTION NETWORK

(71) Applicant: TSINGHUA UNIVERSITY, Beijing (CN)

(72) Inventors: Xiongfeng Ma, Beijing (CN); Yizhi Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/692,524

(22) PCT Filed: Jul. 5, 2022

(86) PCT No.: PCT/CN2022/103966
§ 371 (c)(1),
(2) Date: Mar. 15, 2024

(87) PCT Pub. No.: WO2023/045489
PCT Pub. Date: Mar. 30, 2023

(65) Prior Publication Data
US 2024/0333487 A1    Oct. 3, 2024

(30) Foreign Application Priority Data

Sep. 26, 2021    (CN) .......................... 202111131691.5

(51) Int. Cl.
*H04L 9/08*    (2006.01)
(52) U.S. Cl.
CPC ................................. *H04L 9/0852* (2013.01)

(58) Field of Classification Search
CPC ..................................................... H04L 9/0852
See application file for complete search history.

(56) References Cited

U.S. PATENT DOCUMENTS

| | | | | |
|---|---|---|---|---|
| 8,774,415 | B2 * | 7/2014 | Baba | H04L 9/0852 380/279 |
| 11,095,439 | B1 | 8/2021 | Vakili | |
| 2013/0051559 | A1 * | 2/2013 | Baba | H04L 9/083 380/279 |

FOREIGN PATENT DOCUMENTS

| | | |
|---|---|---|
| CN | 109756329 A | 5/2019 |
| CN | 113179514 A | 7/2021 |
| CN | 113765663 A | 12/2021 |

\* cited by examiner

*Primary Examiner* — Baotran N To
(74) *Attorney, Agent, or Firm* — Birch, Stewart, Kolasch & Birch, LLP (57) ABSTRACT

Provided are a method and an apparatus for enhancing the security of a quantum key distribution network. The quantum key distribution network includes a first node, a second node, and at least one relay node, by means of which the first node and the second node implement a first stage of quantum key distribution; the first node and the second node share a first key pool, which includes at least one key; and the method is executed on either the first node or the second node. The method includes: acquiring a first key obtained after the first stage of quantum key distribution; determining the seed key from the first key pool; generating a first random string by applying, based on the seed key, a first algorithm predetermined with a correspondent node, the first random string having a length equal to that of the first key; and acquiring a second key by performing a preset first bit operation on the first key and the first random string.

11 Claims, 4 Drawing Sheets

METHOD AND APPARATUS FOR ENHANCING SECURITY OF QUANTUM KEY DISTRIBUTION NETWORK

CROSS REFERENCE TO RELATED APPLICATIONS

This application is the National Phase of PCT/CN2022/103966 filed on Jul. 5, 2022, which claims priority under 35 U.S.C. § 119(a) to Patent Application No. 202111131691.5 filed in China on Sep. 26, 2021, all of which are hereby expressly incorporated by reference into the present application.

TECHNICAL FIELD

The present invention relates to the field of quantum communication, and in particular to a method and an apparatus for enhancing the security of a quantum key distribution network.

BACKGROUND

Quantum key distribution (QKD) technology is developed to ensure the security of communication by virtue of the properties of quantum mechanics, whereby both communicating parties can generate and share a random and secure key to encrypt and decrypt messages. It has a wide application range in fields such as practical cryptography, information security and national defense, as well as in various secure communication environments.

However, due to the physical properties of instruments and transmission channels used in the process of quantum key distribution, it is difficult to transmit a key at high speed in long-distance point-to-point communication at present. Furthermore, quantum repeaters (converters for achieving a relay function by means of, for example, the entanglement preparation, entanglement distribution, entanglement purification, and entanglement swapping of quanta) cannot yet meet practical requirements due to the immature quantum storage technology. Consequently, in order to implement long-distance key transmission and further build a quantum communication network, trusted relay nodes are often used now to extend the communication distance and expand the coverage for the quantum communication network. For example, the "Beijing-Shanghai trunk line" quantum communication backbone network, which was completed and put into use in 2017, was based on the trusted relay scheme.

In the trusted relay scheme, besides the two end-use nodes that in effect need to distribute keys, all relay nodes in a link connecting the two ends are also involved in the key distribution process, and have acquired information sufficient for directly obtaining a final key. Therefore, all the relay nodes must be trusted. Otherwise, if anyone of the relay nodes is untrusted, key leakage may be caused and threaten the security of the whole quantum communication network. However, maintaining the complete trustiness of relay nodes would consume huge manpower and material resources, not to mention that many relay nodes will be present in a quantum network, making it very expensive to maintain the security of a quantum communication network.

Therefore, there is a need for a new solution to enhance the security of the quantum key distribution network.

SUMMARY OF THE INVENTION

The embodiments of the present invention provide a method and an apparatus for enhancing the security of a quantum key distribution network.

The method reduces the requirement for the trustiness of relay nodes in quantum key distribution, thereby enhancing the security of the quantum communication network; and additional computational consumption arising from this method is very low.

To solve the above technical problems, the present invention employs a technical solution as follows: in a first aspect, a method for enhancing the security of a quantum key distribution network is provided, wherein the quantum key distribution network includes a first node, a second node, and at least one relay node, by means of which the first node and the second node implement a first stage of quantum key distribution, the first node and the second node share a first key pool, which includes at least one key, and the method is executed on either the first node or the second node and includes:

acquiring a first key obtained after the first stage of quantum key distribution;

determining a seed key from the first key pool;

generating a first random string by applying, based on the seed key, a first algorithm predetermined with a correspondent node, the first random string having a length equal to that of the first key; and acquiring a second key by performing a preset first bit operation on the first key and the first random string.

Preferably, the first algorithm is an advanced encryption standard AES key expansion algorithm.

Preferably, the first random string is a pseudorandom string.

Preferably, the first bit operation is an XOR/XNOR operation.

Preferably, performing the preset first bit operation on the first key and the first random string includes: performing the preset first bit operation on every certain number of bits in the first key and corresponding bits in the first random string.

Preferably, the seed key has a length less than that of the first key.

Preferably, determining the seed key from the first key pool comprises: determining the seed key from the first key pool according to information that is released by the correspondent node and corresponds to the seed key.

Preferably, the method further includes: after determining the seed key from the first key pool, releasing information corresponding to the seed key, to the correspondent node.

Preferably, the method further includes saving the second key to the first key pool.

Preferably, the relay node has an upper limit of computing power which is determined based on the first algorithm.

Preferably, the first node and the second node sharing the first key pool includes: the first node and the second node each has a local backup of the first key pool; and determining the seed key from the first key pool includes: determining the seed key from the local backup of the first key pool.

In a second aspect, an apparatus for enhancing the security of a quantum key distribution quantum key distribution network is provided, wherein the quantum key distribution network includes a first node, a second node, and at least one relay node, by means of which the first node and the second node implement a first stage of quantum key distribution, the first node and the second node share a first key pool, which includes at least one key, and the apparatus is implemented on either the first node or the second node and includes:

a distributed key acquiring unit configured to acquire a first key obtained after the first stage of quantum key distribution;

a seed key determining unit configured to determine a seed key from the first key pool;

a random string determining unit configured to generate a first random string by applying, based on the seed key, a first algorithm predetermined with a correspondent node, the first random string having a length equal to that of the first key; and a final key determining unit configured to acquire a second key by performing a preset first bit operation on the first key and the first random string.

In a third aspect, a computer-readable storage medium storing a computer program is provided, wherein the computer program, when executed in a computer, enables the computer to execute the method described in the first aspect.

In a fourth aspect, a computing device is provided. The computing device includes a memory and a processor, wherein the memory stores an executable code, and the processor, when executing the executable code, implements the method described in the first aspect.

BRIEF DESCRIPTION OF THE DRAWINGS

To describe the technical solutions in the embodiments of the present invention more clearly, the following briefly introduces the accompanying drawings required for describing the embodiments. Obviously, the accompanying drawings in the following description show merely some embodiments of the present invention, and a person of ordinary skills in the art may still derive other drawings from these accompanying drawings without creative efforts.

DETAILED DESCRIPTION OF THE PREFERRED EMBODIMENTS

In order to make the objects, technical solutions and advantages of the embodiments of the present invention clearer, clear and complete description will be made to technical solutions of the present invention in conjunction with the accompanying drawings in the embodiments of the present invention. Obviously, the described embodiments are some instead of all of the embodiments of the present invention. Based on the embodiments in the present invention, every other embodiment obtained by those of ordinary skills in the art without creative labor shall fall within the protection scope of the present invention.

The quantum key distribution network described in the specification is a quantum communication network for implementing or being used for quantum key distribution. For the convenience of setting forth the spirit and basic principle of the present invention, it is first given a brief description of the trusted relay scheme (a long-distance transmission scheme that has been widely used at present) in a current quantum key distribution network.

Figure 1:
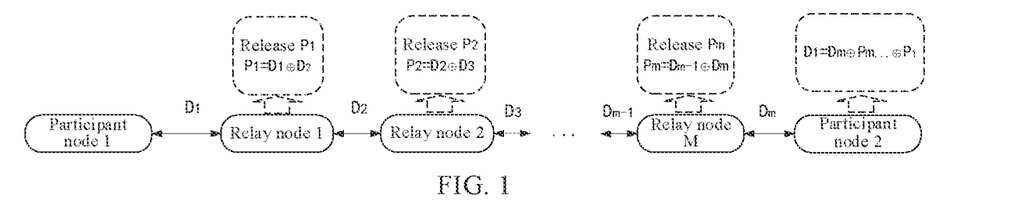
FIG. 1 is a schematic diagram showing a scenario in which long-distance quantum key distribution is performed using a current trusted relay scheme according to an embodiment of the present invention.

First, in the quantum communication network, a communication link connecting two participant nodes distributing keys is determined, and it is necessary that all intermediate (relay) nodes on this link are trusted. Next, each of the participant nodes and relay nodes performs QKD with its adjacent nodes, such that each of the relay nodes acquires two keys based on the QKD and each of the participant nodes acquires one key. Then, each of the relay nodes computes and releases a bitwise XOR result of two keys that it obtains, to achieve the purpose of key exchange. Finally, two user terminals perform XOR computation on their own keys and the results released by all the relay nodes to obtain a final key, thereby completing key distribution between the two participant nodes. For example, FIG. 1 shows a schematic diagram of a scenario in which long-distance quantum key distribution is performed using a current trusted relay scheme according to an embodiment of the present invention. As shown in FIG. 1, key distribution between two participant nodes (participant nodes 1 and 2) is performed by means of, for example, m relay nodes including relay nodes 1 ... to m. The participant node 1, together with the relay node 1, first acquires a key D1 by means of QKD between the two nodes. Next, the relay node 1 and the relay node 2 acquire a key D2 by means of QKD between the two nodes, and the relay node 1 releases, to all nodes, an XOR result P1 of the two keys D1 and D2 that it obtains. Then, the relay node 2 and the relay node 3 repeat a similar behavior, i.e., acquiring a key D3 by means of QKD between the two nodes, and the relay node 2 releases, to all nodes, an XOR result P2 of the two keys D2 and D3 that is obtains. The subsequent nodes repeat a similar behavior in sequence, until the last relay node m and the participant node 2 acquire a key Dm by means of QKD, and the relay node m releases an XOR result Pm of the two keys Dm−1 and Dm that it knows. Furthermore, the participant node 2 may obtain the original key D1 of the participant node 1 according to the key Dm that it knows and the result of XOR performed one by one on the key released by each of the relay nodes, and D1 may be expressed as D1=Dm⊕Pm ... ⊕P1.

This scheme allows quantum key distribution between two terminals at a long distance by adding the relay nodes. But this scheme also has the following security problems: the computation result of each of the relay nodes is released, and each relay node holds two keys distributed with its two adjacent nodes. As a result, any one of the relay nodes can compute the specific values of the keys distributed between all the nodes (including those distributed between the final user terminals) according to these information. For example, in FIG. 1, the relay node 1 knows the final key D1 (which is initially obtained by the relay node 1 and the participant node 1 by means of QKD) distributed between two participants; and the individual relay nodes following the relay node 1 can obtain the key D1 in the same way as the participant node 2, i.e., obtaining D1 by an XOR operation according to the key known by the current node and the information released by all the preceding relay nodes. For example, the relay node 2 can obtain D1 according to D1=D2⊕P1, the relay node 3 can obtain D1 according to D1=D3⊕P2⊕P1, ..., and so on for other relay nodes. Moreover, the computing resources consumed can be almost negligible since the computations involved are all XOR computation. Consequently, if one of the relay nodes is untrusted, it can easily acquire and leak all the information of the final key. Therefore, according to the prior art, it is necessary to ensure the complete trustiness of all the relay nodes (that will not attempt to acquire the final key) in the quantum communication network by other means, which, however, is very expensive (for example, to resort to management means or other non-technical methods).

Figure 2:
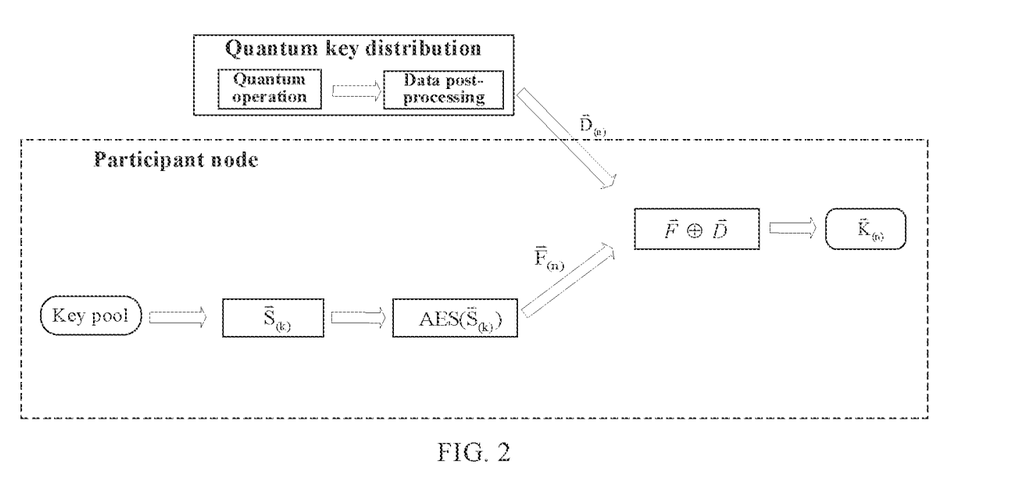
FIG. 2 is a schematic diagram showing the principle of a method for enhancing the security of a quantum key distribution network according to an embodiment of the present invention.

In view of the problems above, an embodiment of the present invention provides a method for enhancing the security of a quantum key distribution network. FIG. 2 shows a schematic diagram of the principle of the method for enhancing the security of the quantum key distribution network according to an embodiment of the present invention. As shown in FIG. 2, this scheme for enhancing the security of a quantum key distribution network is based on a key pool which is shared by individual participant terminals (nodes), and includes some keys distributed among users in advance. It should be noted that this key pool is a shared resource that may be used in many cryptographic protocols, including an information reconciliation process. Therefore, in the case of actual production, this key pool is usually an existing resource, rather than an additionally required resource.

First, in a scenario where a key string of n bits is produced between two participant nodes after one round of key distribution the individual participant nodes distribute a first key $\vec{D}$ (the symbol ___ represents a vector, and $\vec{D}$ is the vectorized representation of the first key) between two user terminals by means of an existing key distribution scheme in the quantum communication network. Here, $\vec{D}=(d_1, d_2, d_3, \ldots, d_n)$, and $d_1 \ldots d_n$ indicates individual bits included in the first key. It should be noted that, in this step, it is not required that the relay nodes are completed trusted. In an embodiment, for example, limitations based on computing power estimation can be applied to the computing resources of relay nodes.

Next, the individual participant may extract a key of several bits from the shared key pool, as a seed string $\vec{S}$. Depending on the embodiment, the length of the seed string may be determined according to a specific generating algorithm of a pseudorandom string used in a subsequent step.

Then, the individual participant nodes may generate, for example a pseudorandom string $\vec{F}$ with the length of n bits based on the seed string $\vec{S}$ (for example, with a length k, k<n) using the same classic algorithm (for example, the AES key expansion algorithm). Here, $\vec{F}=(f_1, f_2, f_3, \ldots, f_n)$, and $f_1 \ldots f_n$ indicates individual bits included in the pseudorandom string.

Finally, by means of, for example, the XOR operation between the first key and auxiliary strings, the individual participant nodes obtain the final key $\vec{K}=k_1, k_2, k_3, \ldots, k_n)$ that is distributed among the individual participant nodes and has the length of n bits. Here, $k_i=d_i \oplus f_i$, i=1, 2, 3, ..., n, and $\oplus$ indicates an XOR operation (or called modulo 2 addition).

Figure 3:
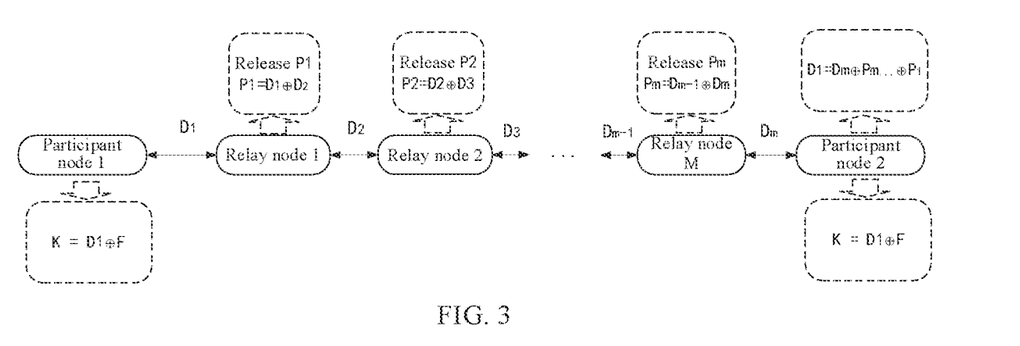
FIG. 3 is a schematic diagram showing a scenario in which long-distance quantum key distribution is performed using a method for enhancing the security of a quantum key distribution network according to an embodiment of the present invention.

FIG. 3 shows a schematic diagram of a scenario in which long-distance quantum key distribution is performed using a method for enhancing the security of a quantum key distribution network according to an embodiment of the present invention. As shown in FIG. 3 although individual relay nodes may obtain a first key D1 (which may correspond to $\vec{D}$ in FIG. 2) in the same manner as a participant node 2, they are unaware of a pseudorandom string F (vectorized as $\vec{F}$) and thus cannot obtain, according to F and D1, a final key K (vectorized as $\vec{K}$) that is distributed between the participant nodes 1 and 2. That is to say, for relay nodes other than the individual participant nodes, it is impossible for them to obtain the final key by means of a conventional computation method in the existing trusted relay scheme. Therefore, the final key distributed between the participants is kept confidential to every relay node.

Therefore, the advantages of this method lie in that: first, the final key is kept confidential to each relay node, thus improving the security of quantum key distribution; and Second, even in a scenario where a relay node attempts to crack the final key by technical means the seed string $\vec{S}$ is undisclosed to the relay node, and thus, the pseudorandom string $\vec{F}$ is generated from the seed string is also unknown. Although the relay node may obtain the value of $\vec{D}$, in order to known the final key $\vec{K}$, it is also necessary to know $\vec{F}$. For the relay node, this process is equivalent to cracking the algorithm used to generate a pseudorandom number, which usually consumes a large number of computational resources (usually exponentially). Therefore, even if the relay node is not trusted, as long as it does not have enough computational resources, it cannot obtain the information of the final key and thus will not threaten the security of the quantum communication network. Hence, with the scheme for enhancing the security according to the embodiment in this specification, it is unnecessary to ensure the complete trustiness of the relay nodes, as long as the computational resources available for them are limited. This is easy to achieve as compared to the existing trusted relay scheme requiring the complete trustiness of the relay nodes. Third, for the individual participant nodes, it takes essentially no additional time since the length of the key consumed by generating $\vec{S}$ is generally far less than n, the process of generating $\vec{F}$ from $\vec{S}$ is also based on a classic and proven method, and the above operation can be performed during key distribution in the quantum communication network. Moreover, for example, the XOR operation also consumes very few computational resources to generate the final key. That is to say, by adopting this method, the total increased resource consumption is very low.

Figure 4:
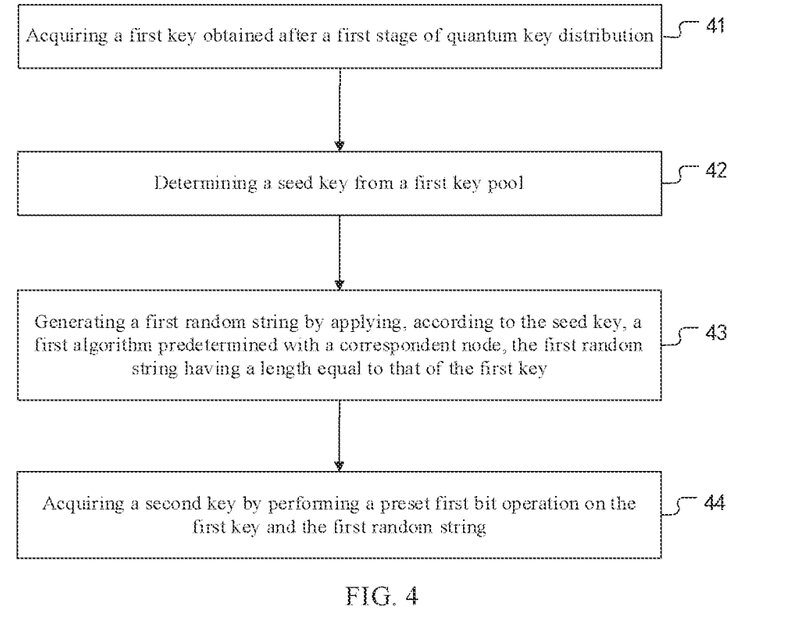
FIG. 4 is a flowchart showing a method for enhancing the security of a quantum key distribution network according to an embodiment of the present invention.

FIG. 4 is a flowchart showing a method for enhancing the security of a quantum key distribution network according to an embodiment of the present invention. The quantum key distribution network includes a first node, a second node, and at least one relay node, by means of which the first node and the second node implement a first stage of quantum key distribution; the first node and the second node share a first key pool, which includes at least one key; and the method is executed on either the first node or the second. As shown in FIG. 4, the method at least includes the following steps:

step 41, acquiring a first key obtained after the first stage of quantum key distribution;

step 42, determining a seed key from the first key pool;

step 43, generating a first random string by applying, on the seed key, a first algorithm predetermined with a correspondent node, the first random string having a length equal to that of the first key; and step 44, acquiring a second key by performing a preset first bit operation on the first key and the first random string.

First in step 41, the first key obtained after the first stage of quantum key distribution is acquired.

In this step, the first stage of quantum key distribution refers to a distribution process using a relay terminal in the prior art. For example, it may be the key distribution process shown in FIG. 1, and the distributed first key may be, for example, D1 in FIG. 1. In this stage, the operations executed by individual participant and relay nodes may be corresponding operations executed by them in the existing trusted relay scheme. However, the complete trustiness of the relay nodes is not required. Depending on the embodiment, the security of the distribution network may also be further improved by limiting the computing power of the relay nodes. Therefore, in an embodiment, the upper limit of computing power of a relay node may be determined based on a specific random string generating algorithm used in a subsequent step. In an example, the complexity of algorithm may be first determined for example according to the specific algorithm; then, it is determined, based on the complexity of algorithm, the computing power (computility), in units of for example FLOPS (floating-point operations per second) or GOPS (giga operations per second), required for cracking the predetermined number of random strings generated according to this algorithm within a present period of time; and finally, the computing power of a relay node may be limited by a hardware or software method such that it is not sufficient to complete the cracking. In fact, it usually requires huge computility to crack the pseudorandom string generating algorithm, making it very difficult for the relay node to acquire a final key within a generally short communication time, and moreover, it is easier to set a limit to the relay node.

As described earlier, the existing quantum key distribution process may generally include a quantum operation stage and a data post-processing stage. Therefore, in an embodiment, the individual participant nodes may acquire the first key that has been subjected to data post-processing.

Furthermore, each node, including the participant nodes (first and second nodes) and relay nodes, does not specifically refer to a terminal device in a quantum key distribution network of the participant nodes and relay nodes. It can be any computing device used by the participant node or relay node for computing processing, including but not limited to a server, a workstation, a minicomputer, a mobile processing terminal or the like. It may also refer to a plurality of computing devices working coordinately. Since the quantum key distribution process may include quantum operation and post-processing, in some embodiments, the individual node may also include a quantum-classic hybrid server, which includes a quantum processor and a classic processor. The quantum processor may be configured to execute the quantum operation, and the classic processor may be configured to execute security enhancement.

Next, in step 32, the seed key is determined from the first key pool.

Since the first key pool is shared by the individual participant nodes, the seed key is also known by the individual participant nodes but not known by the relay nodes. Depending on the embodiment, the first key pool may be shared in different ways. For example, in an embodiment, the individual participants may have a local backup of the first key pool, respectively. Furthermore, the individual participants may each determine a seed key from the local backup of the first key pool.

In various embodiment, the seed key of a different length may be determined depending on the specific random string generating algorithm used in a subsequent step and the encryption strength. For the economy of the shared key, the length of the determined seed key may be generally less than that of the first key.

Then, in step 33, a first random string is generated by applying, on the seed key, a first algorithm predetermined with a correspondent node.

In this step, the first algorithm may be applied to the seed key to obtain the first random string. Due to the fact that the seed key and the first algorithm are known by both the executing node and its correspondent node (i.e., the other participant node for key distribution), the executing node and its correspondent node may generate the same random string according to the same seed key and the first algorithm.

The length of the first random string is equal to that of the first key. In various embodiments, the specific algorithm (first algorithm) for generating the first random string may be different, which is not limited in this specification. In an embodiment, the first algorithm may be an advanced encryption standard (AES) key expansion algorithm. In another embodiment, the first algorithm may also be an SM4 (Chinese block cipher 4) key expansion algorithm. In actual production, a random string is often a pseudorandom string generated based on an algorithm, rather than a strict random string in a truly mathematical sense. Therefore, depending on the embodiment, the first random string may be a pseudorandom string. For example, in the above embodiment where the AES key expansion algorithm is used, the generated random string in essence is a pseudorandom string. In this embodiment, specifically, the random string may be obtained by using a result arising from AES key expansion. In an example, the result arising from AES key expansion may also be clipped to reach a length equal to that of the random string.

It should be noted that step 41 is not limited to be compulsorily executed before steps 42 and 43. Depending on the embodiment, for example, step 41 may also be performed after steps 42 and 43, before step 44, or in parallel with steps 42 and 43, for example.

Finally, in step 44, a second key is acquired by performing a preset first bit operation on the first key and the first random string.

In this step, the final key (second key) may be obtained by performing a bit operation, for example XOR operation, on the first key obtained in step 41 and the first random string obtained in step 43, respectively. This final key is kept confidential to the relay nodes, and is typically difficult for the relay node to crack using their own resources.

In various embodiments, the first bit operation may be a different bit operation. In an embodiment, to achieve better security, the quantity ratio of '0' bits to '1' bits in the second key is desired to reach 1:1. Therefore, the first bit operation may be preferably an XOR/XNOR operation. The reason lies in that, when the input bits of the bit operation show an uniform distribution, the distribution of '0' and '1' in the output result acquired by executing for example the XOR or XNOR operation tends to reach 1:1.

Depending on the embodiment, the specific manner of implementing the first operation to the first key and the first random string may be different. For example, in an embodiment, for example, the bitwise XOR operation may be performed on the first key and the first random string. In another embodiment, the preset first bit operation may also be performed on every several bits in the first key and the corresponding bits in the first random string. Depending on the embodiment, the first bit operation may also be a bit operation agreed between the individual participants. For example, in an embodiment, the individual participants agree on the first operation which generates a two-bit output according to two two-bit inputs. In essence, it is to obtain the output two bits by, for example, changing positions of the two bits of the first key, and then performing XOR operation on the resultant two bits and for example the two bits of the first random string. Furthermore, for example, the first operation may be applied to every two bits in the first key and in the first random string in sequence, thereby obtaining the second key by combining the results of individual operations. Table 1 shows a corresponding relation between input and output in the first operation.

TABLE 1

Input and output in first operation

| First key | 00 | | | | 01 | | | | 10 | | | | 11 | | | |
|---|---|---|---|---|---|---|---|---|---|---|---|---|---|---|---|---|
| Random string | 00 | 01 | 10 | 11 | 00 | 01 | 10 | 11 | 00 | 01 | 10 | 11 | 00 | 01 | 10 | 11 |
| Output | 00 | 01 | 10 | 11 | 10 | 11 | 00 | 01 | 01 | 00 | 11 | 10 | 11 | 10 | 01 | 00 |

In an additional embodiment, the individual participants may also agree on for example a second operation, which, for example, may be applied to three bits or more bits in pair. In essence, for example, it may be to obtain an output result by selecting one from two input bit strings, changing the positions of individual bits in the selected string, and then performing XOR by bit on the selected string and the other string. In various examples, the principle of changing the positions of bits may also be pre-agreed by the individual participants. For example, for a three-bit string expressed as 'a1a2a3', the result arising from changing the positions of bits may be, for example, 'a1a3a2' or 'a2a3a1' or the like as pre-agreed, in different examples.

In an embodiment, the final key (second key), after being obtained, may also be saved to the key pool, i.e., the first key pool, shared by the individual participants.

Figure 5:
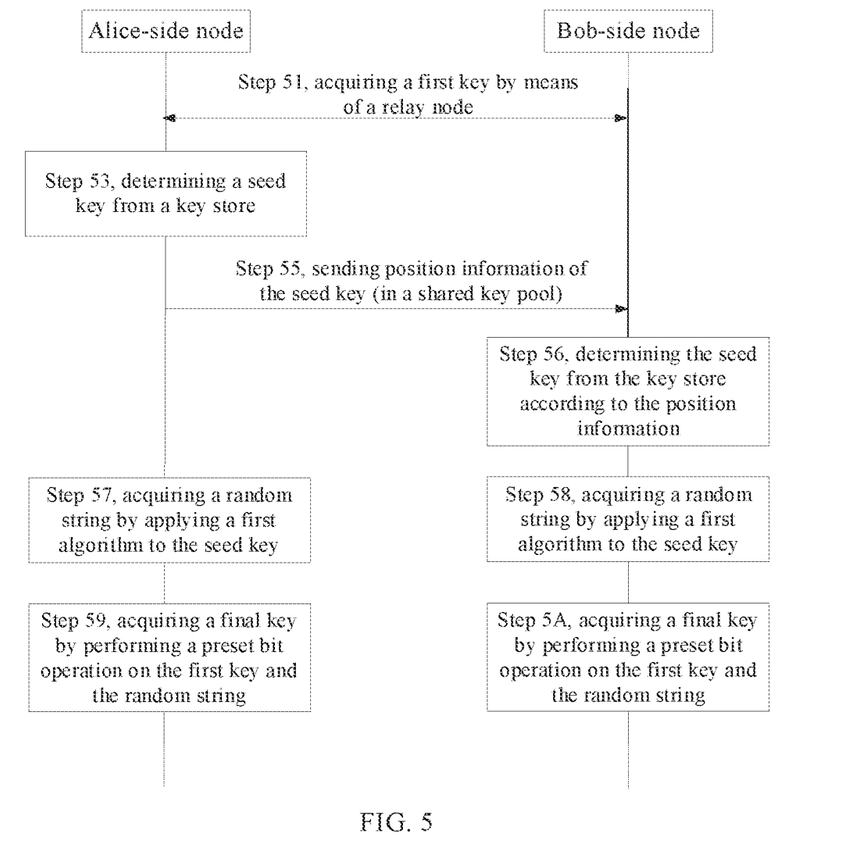
FIG. 5 is a flowchart showing a method for enhancing the security of a quantum key distribution network according to another embodiment of the present invention.

FIG. 5 is a flowchart showing a method for enhancing the security of a quantum key distribution network according to another embodiment of the present invention. In the embodiment shown in FIG. 5, one of the participants may determine the seed key from the first key store (i.e., key pool), and then release the information corresponding to the seed key to the other participant. For example, the information may be the position of the determined seed key in the shared key store. The other participant, after receiving the information corresponding to the above seed key, may determine the seed key from the first key store according to the received information. Hence, the individual participants may obtain the same first random string respectively according to the same seed key, and then obtain the same final key, respectively. As shown in FIG. 5, for examples, Alice-side and Bob-side nodes may acquire a first key through at least one relay node (step 51). Then, the Alice-side node extracts a seed key from its local key pool (step 53), and then sends the position of the seed key in the key pool to a Bob-side terminal (step 55) by means of a common channel, thereby enabling the Bob side to acquire the same seed key from its local seed pool according to this position (step 56). Then, Alice-side and Bob-side terminals each generate a random string according to the acquired seed key (steps 57 and 58, respectively). Finally, the Alice-side and Bob-side terminals may perform a preset bit operation, for example XOR operation, on the first key and the random string, respectively, to obtain the final key (steps 59 and 5A, respectively).

In summary, the method for enhancing the security of the quantum key distribution network according to the embodiments in this specification has the following advantages. In one aspect, since the final key is kept confidential to individual relay nodes, there is no need for the relay nodes to be fully trusted. The relay node needs to have a large amount of computational resources to acquire the final key, and thus it is convenient to prevent the same by setting a limit to the upper limit of the relay node in terms of computational resources. In another aspect, implementing this method consumes a few additional computational resources, which will not significantly increase the computational burden of the quantum key distribution network.

Figure 6:
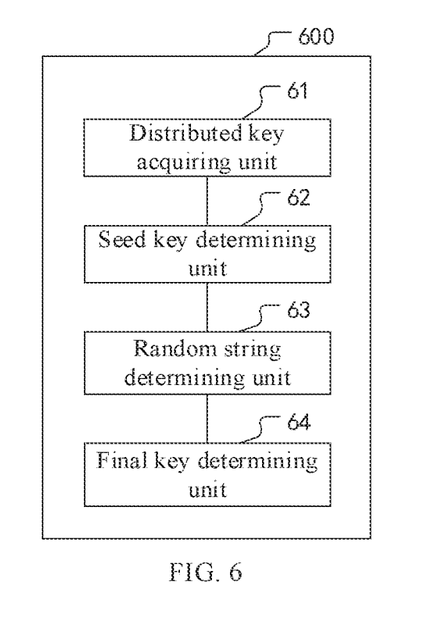
FIG. 6 is a structural diagram showing an apparatus for enhancing the security of a quantum key distribution network according to an embodiment of the present invention.

According to an embodiment in a further another aspect, an apparatus for enhancing the security of a quantum key distribution network is provided. FIG. 6 is a structural diagram showing an apparatus for enhancing the security of a quantum key distribution network according to an embodiment of the present invention. The quantum key distribution network includes a first node, a second node, and at least one relay node, by means of which the first node and the second node implement the first stage of quantum key distribution, the first node and the second node share a first key pool, which includes at least one key, and the apparatus is implemented on either the first node or the second node. As shown in FIG. 6, the apparatus 600 includes:
- a distributed key acquiring unit 61 configured to acquire a first key obtained after the first stage of quantum key distribution;
- a seed key determining unit 62 configured to determine a seed key from the first key pool;
- a random string determining unit 63 configured to generate a first random string by applying, based on the seed key, a first algorithm predetermined with a correspondent node, the first random string having a length equal to that of the first key; and
- a final key determining unit 64 configured to acquire a second key by performing a preset first bit operation on the first key and the first random string.

According to an embodiment in a further another aspect, a computer-readable medium storing a computer program is further provided. The computer program, when running, executes the method described above.

According to an embodiment in a further another aspect, a computing device is further provided. The computing device includes a memory and a processor; the memory stores an executable code; and the processor, when executing the executable code, implements the method described above.

The specific embodiments of the present invention are described above. Other embodiments shall fall within the scope of the appended claims. In some cases, the operations and steps stated in the claims can be executed in an order different from that in the embodiments to achieve a desired result as well. In addition, the processes depicted in the accompanying drawings are not necessarily performed based on the illustrated specific order or continuous order to achieve the desired result. In some embodiments, multi-task processing and parallel processing are also possible or may be advantageous.

Those skilled in the art may be further ware of that the units and algorithm steps in each example described in conjunction with the embodiments disclosed herein may be implemented by using electronic hardware, computer software or a combination of thereof. For a clear understanding of the interchangeability between the hardware and the software, the composition and steps of each example are described by function in general in the description above. Whether these functions are executed in a form of hardware or software depends on the specific application of the technical solution and design constraints. Those skilled in the art may implement the described functions by using different methods for each specific application, but such implementation should not be construed as going beyond the scope of the present invention.

The steps of the methods or algorithms described in conjunction with the embodiments disclosed herein may be implemented by using hardware, software modules executed by a processor, or a combination of the two. The software modules may be placed in a random-access memory (RAM), an internal memory, a read-only memory (ROM), an electric programmable ROM, an electric erasable programmable ROM, a register, a hard disk, a removable magnetic disk, a CD-ROM, or storage mediums in any other forms as commonly known in the technical field.

The objects, technical solutions and advantageous effects of the present invention are further illustrated in detail with the specific embodiments described above. It should be understood that the description above only involves the specific embodiments of the present invention and is not intended to limit the protection scope of the present invention. Any modifications, equivalent substitutions, improvements and the like made within the spirit and principle of the present invention shall be construed as being included within the protection scope of the present invention.

The invention claimed is:

1. A method for enhancing security of a quantum key distribution network, wherein the quantum key distribution network comprises a first node, a second node, and at least one relay node, by means of which the first node and the second node implement a first stage of quantum key distribution, the first node and the second node share a first key pool, which comprises at least one key, and the method is executed on the first node and comprises:
   acquiring a first key obtained after the first stage of quantum key distribution;
   determining a seed key from the first key pool according to information that is released by the second node and corresponds to the seed key; or determining a seed key from the first key pool and then releasing information corresponding to the seed key to the second node;
   generating a first random string by applying, based on the seed key, a first algorithm predetermined with the second node, the first random string having a length equal to that of the first key; and
   acquiring a second key by performing a preset first bit operation on the first key and the first random string.

2. The method according to claim 1, wherein the first algorithm is an advanced encryption standard AES key expansion algorithm.

3. The method according to claim 1, wherein the first random string is a pseudorandom string.

4. The method according to claim 1, wherein the first bit operation is an Exclusive OR (XOR) operation, or Exclusive NOR (ENOR) operation.

5. The method according to claim 1, wherein performing the preset first bit operation on the first key and the first random string comprises: performing the preset first bit operation on every certain number of bits in the first key and corresponding bits in the first random string.

6. The method according to claim 1, wherein the seed key has a length less than that of the first key.

7. The method according to claim 1, further comprising saving the second key to the first key pool.

8. The method according to claim 1, wherein the relay node has an upper limit of computing power which is determined based on the first algorithm.

9. The method according to claim 1, wherein the first node and the second node sharing the first key pool comprises: the first node and the second node each has a local backup of the first key pool; and
   determining the seed key from the first key pool comprises: determining the seed key from the local backup of the first key pool.

10. An apparatus for enhancing security of a quantum key distribution quantum key distribution network, wherein the quantum key distribution network comprises a first node, a second node, and at least one relay node, by means of which the first node and the second node implement a first stage of quantum key distribution, the first node and the second node share a first key pool, which comprises at least one key, and the apparatus is implemented on the first node and comprises:
   means for acquiring a first key obtained after the first stage of quantum key distribution;
   means for determining a seed key from the first key pool according to information that is released by the second node and corresponds to the seed key, or determining a seed key from the first key pool and then releasing information corresponding to the seed key to the second node;
   means for generating a first random string by applying, based on the seed key, a first algorithm predetermined with the second node, the first random string having a length equal to that of the first key; and
   means for acquiring a second key by performing a preset first bit operation on the first key and the first random string.

11. A computing device, comprising a memory and a processor, wherein the memory stores an executable code, and the processor, when executing the executable code, implements a method for enhancing security of a quantum key distribution network, wherein the quantum key distribution network comprises a first node, a second node, and at least one relay node, by means of which the first node and the second node implement a first stage of quantum key distribution, the first node and the second node share a first key pool, which comprises at least one key, and the method is executed on the first node and comprises:
   acquiring a first key obtained after the first stage of quantum key distribution;
   determining a seed key from the first key pool according to information that is released by the second node and corresponds to the seed key; or determining a seed key from the first key pool and then releasing information corresponding to the seed key to the second node;
   generating a first random string by applying, based on the seed key, a first algorithm predetermined with the second node, the first random string having a length equal to that of the first key; and acquiring a second key by performing a preset first bit operation on the first key and the first random string.

* * * * *